Sept. 29, 1942.   KARL-GEORG HOLSTEN   2,297,476
GONIOMETER
Filed Jan. 16, 1941

Inventor.
Karl-Georg Holsten
by- *[signature]*
Attorney

Patented Sept. 29, 1942

2,297,476

UNITED STATES PATENT OFFICE 2,297,476

GONIOMETER

Karl-Georg Holsten, Berlin, Germany; vested in the Alien Property Custodian

Application January 16, 1941, Serial No. 374,652
In Germany January 18, 1940

3 Claims. (Cl. 250—11)

In order to screen or shield the field coils and search coils of goniometers electrostatically from each other the practice has been to insert wires or tapes of copper, for instance, between the coils and longitudinally of the axis of the goniometer; the end faces of the cylindrical goniometer body have been screened by means of flat wire spirals.

Arrangements of this kind are difficult to manufacture. Above all it is difficult to insert the screening wires or tapes since the distance between the field and search coils is comparatively small.

Figure 1:
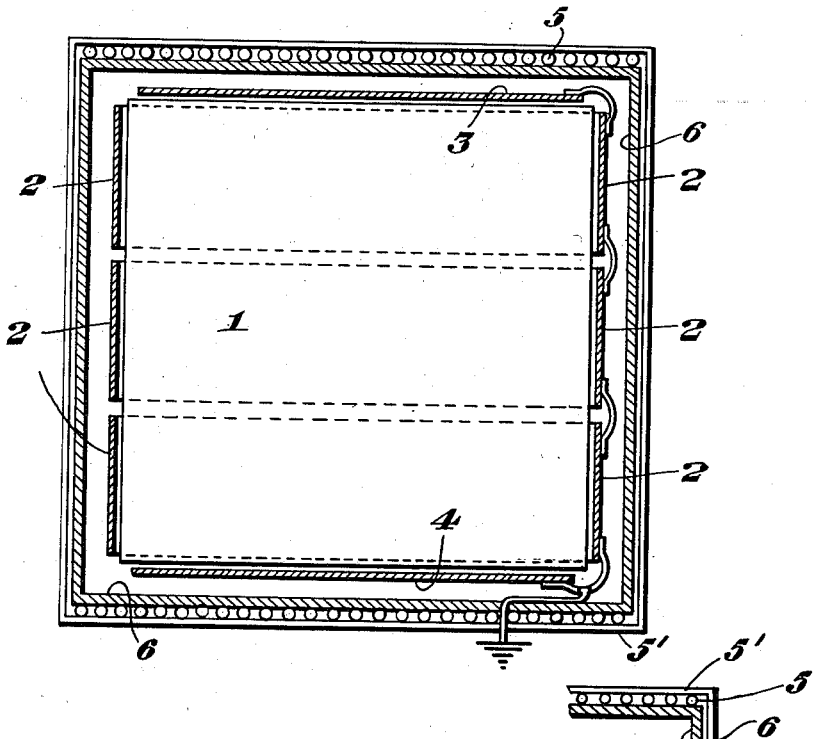
Figures 2, 2A:
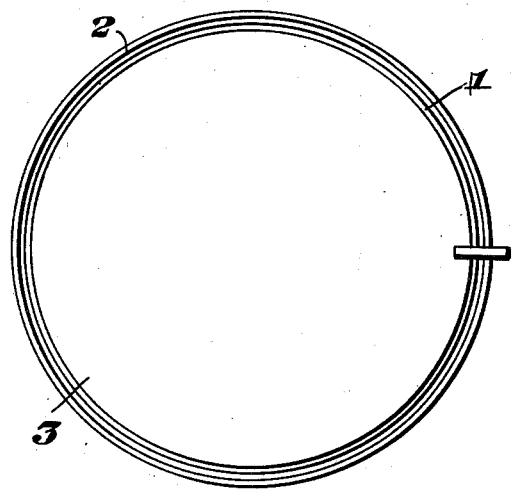

The invention is concerned with a novel construction of such static screening means, as will be understood from the following description and the accompanying drawing, in which Fig. 1 is a diagrammatic sectional view showing one embodiment of the invention, Fig. 2 is a diagrammatic end view of the screened search coil represented in Fig. 1, and Fig. 2A shows a modification of the invention.

The novel arrangement is based on the fact that a short-circuiting ring located transversely of the axis of rotation has no effect upon the fluxes in the goniometer. According to the invention the field coils 5 and 5', and search coil 1 are screened from each other by a metal cylinder subdivided into rings 2 which are connected together and to earth at a single spot or point. The end faces of the coil 1 are screened by metal plates 3, 4 made of copper, for instance. The plates 3, 4 are likewise joined to the rings 2 and to earth at a single point.

The advantage of this arrangement is that the surface of the screening means 2, 3, 4 is comparatively large and that the rings 2 are easier to arrange than are wires or tapes. Furthermore, the subdivision of the screening means is reduced to a minimum, thus ensuring a maximum of screening effect.

Instead of rings 2 fitted to the search coil, screening rings 2' may be fitted to the internal surface of the body or casing 6 carrying the field coils 5 and 5', as shown in Fig. 2A. The rings 2' may be provided by the well-known spraying operation or by electro-deposition, or may be pressed into the body 6.

What is claimed is:

1. A goniometer comprising field coils, a casing carrying these coils, a search coil within such casing, and a screening metal cylinder between the field coils and the search coil, such cylinder being subdivided into rings connected together and to earth at a single point.

2. A goniometer according to claim 1, wherein the said rings are fitted to the internal surface of said casing.

3. A goniometer comprising field coils, a casing supporting said coils, a cylindrical search coil within said casing, a metal screening cylinder between the field coils and the search coil, said cylinder being subdivided into rings connected together, a screening plate at each end of said search coil and means for connecting said cylinder and said screening plates to ground.

KARL-GEORG HOLSTEN.